(12) United States Patent
Zach et al.

(10) Patent No.: US 11,565,890 B2
(45) Date of Patent: Jan. 31, 2023

(54) INSTALLATION AND METHOD FOR SORTING CONTAINERS

(71) Applicant: Fresenius Kabi Austria GmbH, Graz (AT)

(72) Inventors: Bernhard Zach, Graz (AT); Bernd Diex, Graz (AT)

(73) Assignee: Fresenius Kabi Austria GmbH, Graz (AT)

( * ) Notice: Subject to any disclaimer, the term of this patent is extended or adjusted under 35 U.S.C. 154(b) by 0 days.

(21) Appl. No.: 17/424,473

(22) PCT Filed: Mar. 11, 2020

(86) PCT No.: PCT/EP2020/056546
§ 371 (c)(1),
(2) Date: Jul. 20, 2021

(87) PCT Pub. No.: WO2020/182904
PCT Pub. Date: Sep. 17, 2020

(65) Prior Publication Data
US 2022/0081225 A1 Mar. 17, 2022

(30) Foreign Application Priority Data
Mar. 14, 2019 (EP) .................................. 19162846

(51) Int. Cl.
*B65G 47/84* (2006.01)
*B07C 5/34* (2006.01)
*B65G 47/76* (2006.01)

(52) U.S. Cl.
CPC .......... *B65G 47/846* (2013.01); *B07C 5/3408* (2013.01); *B65G 47/766* (2013.01); *B65G 47/84* (2013.01); *B65G 2201/0244* (2013.01)

(58) Field of Classification Search
CPC .......... B07C 5/34; B07C 5/3408; B65G 47/84; B65G 47/846; B65G 2201/0244; B65G 47/766
(Continued)

(56) References Cited

U.S. PATENT DOCUMENTS 2,630,203 A * 3/1953 Lippold ............... B65G 47/846
198/608
4,125,184 A * 11/1978 Seragnoli ............... B65G 47/52
198/367
(Continued)

FOREIGN PATENT DOCUMENTS

DE 2704614 8/1978
DE 102016200150 7/2017
(Continued)

OTHER PUBLICATIONS

International Search Report with English translation and Written Opinion, counterpart International Appl. No. PCT/EP2020/056546 (dated May 13, 2020) (13 pages).

*Primary Examiner* — James R Bidwell
(74) *Attorney, Agent, or Firm* — Cook Alex Ltd.

(57) ABSTRACT

An installation for sorting containers, in particular medicine bottles, including a star wheel having a multiplicity of pockets. The pockets each accommodate a container, and therefore the container can be transported by virtue of the star wheel being rotated. The installation includes a first and a second exit, wherein the containers can be fed either to the first exit or to the second exit by retracting and extending of a first diverter and a second diverter, which are located opposite one another on a transporting path. The first and the second diverters are designed to be capable of extending and retracting with respect to a base region of the transporting path.

20 Claims, 14 Drawing Sheets

(58) Field of Classification Search
USPC .......... 198/370.1, 457.05, 457.07, 459.3
See application file for complete search history.

(56) References Cited

U.S. PATENT DOCUMENTS

| | | | | |
|---|---|---|---|---|
| 4,295,558 | A * | 10/1981 | Heckmann | B65G 47/846 |
| | | | | 209/523 |
| 4,879,025 | A * | 11/1989 | Shapcott | B07C 5/36 |
| | | | | 209/928 |
| 5,193,691 | A * | 3/1993 | Chong | B07C 5/06 |
| | | | | 209/912 |
| 6,131,720 | A * | 10/2000 | Heuft | B65G 47/71 |
| | | | | 198/367 |
| 6,446,781 | B1 * | 9/2002 | De Villele | B65G 47/766 |
| | | | | 198/367 |
| 6,467,609 | B1 * | 10/2002 | Williams | B41F 17/22 |
| | | | | 198/441 |
| 11,292,673 | B2 | 4/2022 | Kupfer et al. | |
| 11,339,007 | B2 | 5/2022 | Börret et al. | |

FOREIGN PATENT DOCUMENTS

| | | | | |
|---|---|---|---|---|
| JP | S56-99123 | | 8/1981 | |
| JP | 61-58366 | | 12/1986 | |
| JP | H04-260480 | | 9/1992 | |
| WO | 2015/074801 | * | 5/2015 | ........... B65G 47/82 |
| WO | WO2019/219253 | | 11/2019 | |
| WO | WO2019/233723 | | 12/2019 | |

\* cited by examiner

INSTALLATION AND METHOD FOR SORTING CONTAINERS

The present application is a U.S. National Stage of PCT International Patent Application No. PCT/EP2020/056546, filed Mar. 11, 2020, which claims priority to EP Application No. 19162846.0, filed Mar. 14, 2019, both of which are hereby incorporated herein by reference.

FIELD OF THE INVENTION

The invention relates to a system and a method for sorting containers. In particular, the invention relates to a system and a method for sorting bottles filled with a medical liquid, which are guided in a step register during the manufacturing process, with the bottles being fed to a good product outlet or a bad product outlet.

BACKGROUND OF THE INVENTION

When filling containers, in particular bottles, it is known in practice that individual, defective containers are fed to a so-called bad product outlet. Thus, the different manufacturing steps are for example monitored during the filling. If a manufacturing step is defective or a container has been damaged, it is sorted out to a bad product outlet. The bad product outlet can, however, also be used to set aside containers as reserve samples or test samples.

The filling of containers with a medical liquid, which for example is used as an infusion solution, as enteral or parenteral nutrition or as a medicine, is subject to high safety precautions. The occurrence of incorrect sorting during the sorting process must be ruled out using system technology, for example whereby it is not the container to be sorted out, but rather another container that is fed to the bad product outlet and said container is sorted out instead of the defective container.

The publication DE 27 046 14 C2 shows a sorting apparatus, which comprises two star wheels. The containers can be selectively fed to a first or a second movement path using pistons connected to a piston and thus sorted.

A piston can thereby only be extended in each case when the other piston is retracted.

In the case of a filling system, in which the containers are moved exactly one position further for each production step, this is usually not a problem since there is enough time to switch over.

In particular, filling systems, by means of which a large number of containers should be filled, do however comprise a plurality of filling stations operating in parallel. Thus, in the case of each cycle, i.e., each time the containers are moved further, a plurality of containers are moved. In order to achieve a high throughput, the speeds at which the containers are moved in a system of this type are high.

This leads to the sorting system described above and known from the prior art not being fast enough at least during one cycle to carry out a switch from good product to bad product outlet. Each of the pistons must be extended virtually over the entire width of the movement path. The star wheel is, however, moving so fast that the piston is not retracted in time before the next container reaches the piston.

For this purpose, it is alternatively known from practice to hold the containers with vacuum plates in the star wheel. When a vacuum is applied, the container remains on a movement path which is determined by the rotation of the star wheel. In contrast, if the vacuum is switched off, containers are ejected to an open wall due to the centripetal force and thus directed to another movement path. Thus, sorting can be carried out by switching the vacuum plates. Sorting systems of this type are also suitable for high speeds since the vacuum plates can be switched independently of one another.

A pneumatic sorting system of this type is, however, both complicated to manufacture and expensive to operate. It has also been found that a pneumatic sorting system of this type with vacuum plates is prone to errors. Thus, it happens time and again that individual containers are ejected from the guides of the transport and sorting system during the sorting. This requires a shutdown of the system which leads to costly production stoppages. In particular when toxic liquids are filled, there is also still a safety risk if the ejected container breaks.

OBJECT OF THE INVENTION

The object underlying the invention is therefore to provide a system and a method for sorting containers, in which the mentioned disadvantages of the prior art are at least reduced.

It is in particular an object of the invention to provide a system for sorting, by means of which containers can be sorted out even during a cycle and which has a high reliability.

SUMMARY OF THE INVENTION

The object of the invention is already achieved by a system for sorting containers, in particular medical bottles, and by a method for sorting containers according to one of the independent claims.

Preferred embodiments and further developments of the invention can be found in the subject matter of the dependent claims, the description and the drawings.

The invention relates, on the one hand, to a system for sorting containers.

The invention will be described in detail by a system for sorting containers, in particular medical bottles, comprising a star wheel with a plurality of pockets, which each receive a container such that said container is transportable by a rotation of the star wheel, with the system comprising a first and a second outlet, and the containers can be fed either to the first or the second outlet by retracting and extending a first and a second deflector which are located opposite one another on a transport track. The system is characterized in that the first and the second deflectors are formed as so to be extendable and retractable starting from a base region of the transport track.

The system according to the invention is suitable in particular for sorting containers which are filled with 10 to 1000 ml, preferably with 50 to 600 ml of liquid. The containers are in particular formed as glass or plastic bottles. The container can e.g., also be formed as a vial.

The system is in particular designed to fill containers with a medical liquid. This can be in particular an infusion solution, an enteral or parenteral liquid or a medicine. The system can also be used to sort containers which are not filled with a liquid, but with a solid, such as for example a powder.

Since the system comprises a star wheel with pockets, the containers are transportable in a step register in which each container is assigned a unique position in the transport system during the manufacturing process.

The system with the step register, via which the container is fed to the different production steps, ensures that the position of the container is uniquely defined within the system. Thus, a unique position is allocated to the individual container and another container cannot adopt the position of a preceding container when it is removed from the transport system.

The containers are transported through a rotation of the preferably horizontally arranged star wheel. Through the rotation of the star wheel, a transport track is defined which extends in a circular manner around the rotational axis of the star wheel. The containers are arranged in pockets which are preferably formed as substantially circular segment-shaped recesses. The containers are preferably moved by these pockets along a circular segment-shaped guide which extends around the star wheel.

It is essential to the invention in particular that the first deflector and the second deflector, via which a container is fed either to a first outlet or a second outlet, can be extended from a base region of the transport track. The transport track is defined as a lane along which the containers are moved.

The first deflector and the second deflector are preferably located opposite one another.

The base region can in particular be a plate along which the containers transported by the star wheel travel. The base region can in one configuration also be configured as a rail or as another guide.

Through the deflectors located opposite one another on the transport track along the star wheel, it is possible for each deflector to adopt only roughly half the width of the transport track.

Furthermore, by retracting and extending from the base region, it is made possible for the deflectors to be retracted and extended independently of one another.

One deflector can thus already be extended, while the other deflector is still being retracted.

Moreover, a deflector extending from the base region, unlike e.g., a piston, which can be extended from the side, is formed as a guide along the transport track immediately when the extension starts or up until the retraction ends. This makes it possible to already lower one deflector during the switchover of the deflectors, while the container is still in contact with the deflector.

Switchover processes can be carried out more quickly with the invention. It is in particular also possible to carry out a switchover during a cycle, i.e., while the containers are being moved a number of positions further, without stopping or in continuous operation.

The first deflector and the second deflector can in particular be extended from a base transversely to the transport track. The containers can in particular be moved along a transport track arranged substantially horizontally, while the deflectors can be retracted vertically from below into the transport track.

According to one embodiment of the invention, the first deflector can be extended, while the second deflector is at least partially still extended. This makes it possible for retracting and extending to overlap, enabling higher speeds. The deflectors are preferably formed in such manner that it is possible to raise the first deflector and the second deflector simultaneously (even when this is not necessary during the operation of the system).

In the case of a further development of the invention, the first or the second deflector or the first and the second deflector have segments divided in the extension direction.

The segments can be retracted and/or extended in different manners, in particular independently of one another.

According to this embodiment of the invention, a front segment of the deflector, viewed in the transport direction, can thus still be extended, while a rear segment of the deflector, past which for example the container has already traveled, is retracted.

This enables, on the one hand, a faster switchover. On the other hand, a part of a deflector in the form of a segment can already be extended, while another part of the deflector, i.e., another segment, is still blocked by a container.

This enables, in particular even with larger containers of for example over 300 ml fill volume, a fast and reliable switchover.

The first deflector and/or second deflector can according to one embodiment of the invention be extended from a plate, which provides the base region, and be retracted into the plate.

According to a preferred embodiment, the first deflector and/or second deflector are formed as a blade.

A blade is understood as a plate which is extended from the base region.

The extension of the deflectors can for example take place electrically, hydraulically or pneumatically.

In particular, electric linear motors are suitable to extend and retract the deflector. Linear motors of this type can be freely parameterized in terms of the movement speed and the switching times. It is thus easily possible to optimally set the system for sorting and/or to reprogram it for different containers.

If at least one deflector is divided into segments, each segment preferably has its own drive. Thus, one segment can be controlled completely independently of the other segment.

According to another embodiment of the invention, two segments can, however, be extended and retracted using only one drive at different times by for example a mechanical coupling of the segments being provided in such manner that one segment follows the other segment in a time-delayed manner during retraction or extension.

The first deflector and/or the second deflector are preferably formed curved. The radius of curvature thereby preferably corresponds substantially to the outer radius of a movement path of the containers.

Starting from a position at which the deflectors are located opposite one another, the containers thus follow either the movement path predefined by the star wheel or are directed away from this movement path into another direction, with the radius of curvature of the movement path being retained.

The two deflectors can thus be structured symmetrically.

In the case of a preferred embodiment, the first and/or second outlet leads to a second and/or third star wheel.

The containers are thus fed via the system for sorting to at least one, preferably two further star wheels.

The step register thus remains intact even after the sorting.

The first deflector is in particular provided to direct a container into a good product outlet in the extended state. The second deflector is in particular provided to direct a container into an opposite bad product outlet in the extended state.

As described at the outset, the bad product outlet can serve not only for sorting out defective containers, but can also be used for setting aside reserve or control samples.

The invention further relates to a method for sorting containers, which is in particular configured with the system described above.

The invention will be described in detail by a method for sorting containers, in particular comprising a previously described system, with containers being transported using a rotating star wheel, which has pockets, with the containers being transported by the star wheel to at least one deflector, with a container being directed either to a first outlet or to a second outlet by retracting and extending the at least one deflector. The method is characterized in that the at least one deflector is extended from below into a movement path of the containers to the first outlet or to the second outlet.

It is essential to the invention that the at least one deflector is retracted from below into the movement path, i.e., the track, on which a container is transported by the star wheel.

As already described in connection with the system according to the invention, the extension from below enables an independent retraction and extension of the deflectors. Moreover, it is advantageous that even at the start of the extension, i.e., when a deflector is extended only partially and not fully, it already provides a contact surface which corresponds to the outer track of the movement path of the container.

The method according to the invention can also be carried out with a system which also comprises only a single deflector.

If a single deflector is used, this is preferably formed in such manner that it extends over the entire width of the movement path, i.e., in particular from an inner radius to an outer radius.

The method is, however, preferably carried out with a system comprising a first deflector and a second deflector, with the first and the second deflector being located opposite one another.

The at least one deflector is preferably extended from a base region of the movement path. The base region can in particular be a plate with a slot from which the at least one deflector is extended.

In the case of a further development of the invention, the at least one deflector is divided into a front and a rear segment. When switching from the first outlet to the second outlet or vice versa, the rear segment is retracted and/or extended earlier than the front segment. The front segment and the rear segment are in the context of the invention defined according to the movement direction of the containers.

A container to be sorted thus first reaches the rear segment of the deflector, from where it is directed along the deflector and along the front segment into a desired direction.

Due to the segmenting of the deflector, the rear segment can be retracted at the latest when the container is still only in contact with the front segment of the deflector.

This makes higher speeds possible on the one hand. On the other hand, the switchover can already be initiated when a front segment is still blocked by a container. The container is thus still moved over the retracted front segment, while the rear segment of the deflector is already extended.

The at least one deflector is preferably extended in such manner that it reaches beyond a tipping point of the containers, preferably at least up to a center of gravity of the containers.

When the star wheel rotates, the containers are subjected to a centripetal force. In the region in which the containers are transported only by the star wheel, the star wheel is surrounded by a circular segment-shaped guide.

In the region of the at least one deflector, the deflector acts as a guide. If the deflector is not extended up to the height of the center of gravity of the container to be sorted, a force component arises with increasing speed due to the centripetal force, which is so great that the container can tip via the deflector. The at least one deflector is therefore raised in such manner that it protrudes at least over a tipping point.

However, it is simultaneously advantageous when the deflector is extended as little as possible since then a faster switchover is possible.

However, it has been found that in particular a deflector extended at least to the center of gravity, which is naturally beyond the tipping point, leads to a very smooth and reliable running of the system.

According to one embodiment of the invention, the at least one deflector is retracted and/or extended in continuous operation or during a cycle, in which a plurality of containers are moved a number of positions further without stopping.

It is thus possible by means of the method according to the invention to carry out a switchover during an ongoing movement of the containers.

If the method is carried out with a system comprising two deflectors, a first deflector can be retracted and/or extended so as to overlap a second deflector.

Furthermore, a first deflector can be extended, while a second deflector is still in contact with a container which is directed to an outlet.

The first deflector and/or the second deflector can be retracted at least in sections, while a container is still in contact with the other deflector due to the retraction and extension from below during the switch from the first outlet to the second outlet or vice versa.

This is possible both in the case of the embodiment with one deflector, which is divided into two segments in the extension direction, and also with a one-part deflector.

If a deflector is divided into at least one front and one rear segment, the rear segment can already be extended when a container still blocks the front segment. The rear segment is thus already available to deflect the next container, while the preceding container is still located on the front segment.

The method is preferably carried out in a filling system, by means of which containers, in particular bottles filled with a medical liquid, are manufactured.

In the filling system, the containers are firstly filled, sealed and then sorted by retracting and extending the at least one deflector.

In the system, the containers are preferably guided in a step register.

The individual manufacturing steps are monitored by the filling system.

For example, the containers can be controlled e.g., visually using a camera before, during and/or after a manufacturing step. Thus, damage can for example be automatically detected.

Furthermore, the fill level can be controlled during filling and/or after filling. This can for example take place by controlling the flowrate of the filling system or by weighing the containers.

The step of sealing the containers can also be controlled. For example, medical liquids are often filled in a nitrogen atmosphere. In particular, the opening can be gassed with nitrogen when sealing the container. Lack of nitrogen gassing therefore leads to a defective container.

Each fault identified, which is registered by the system, can be uniquely assigned to a container guided in the step register.

The sorting preferably follows all production steps which are monitored. By means of the step register, defective containers can be sorted out to a central point at the end of the production process.

The system preferably works in a cycle operation in such manner that in the case of one cycle a plurality of containers are simultaneously subjected to a production step, such as for example filling.

For example, a plurality of filling systems are operated in parallel via which a plurality of containers are simultaneously filled.

Then, the containers are moved a number of positions further without being stopped.

Due to the fast switchover of the at least one deflector, which is possible according to the invention, it is possible to sort out an individual container even during a cycle.

It is in particular possible to switch over the at least one deflector, while the containers are moved at a speed of more than 0.2 m/s, preferably more than 0.3 m/s along the transport track.

According to the invention, the first outlet is preferably defined as a good product outlet and the second outlet as a bad product outlet, in which defective containers are sorted out into containers to be checked and/or reserve containers.

BRIEF DESCRIPTION OF THE DRAWINGS

The subject matter of the invention will be explained in more detail below with reference to the drawings FIG. 1 to FIG. 7 on the basis of a schematically represented exemplary embodiment.

With reference to the top view of the region of the deflectors according to FIG. 6, the geometry of the deflectors and their arrangement in the movement path of the containers will be explained in more detail.

Figure 7:
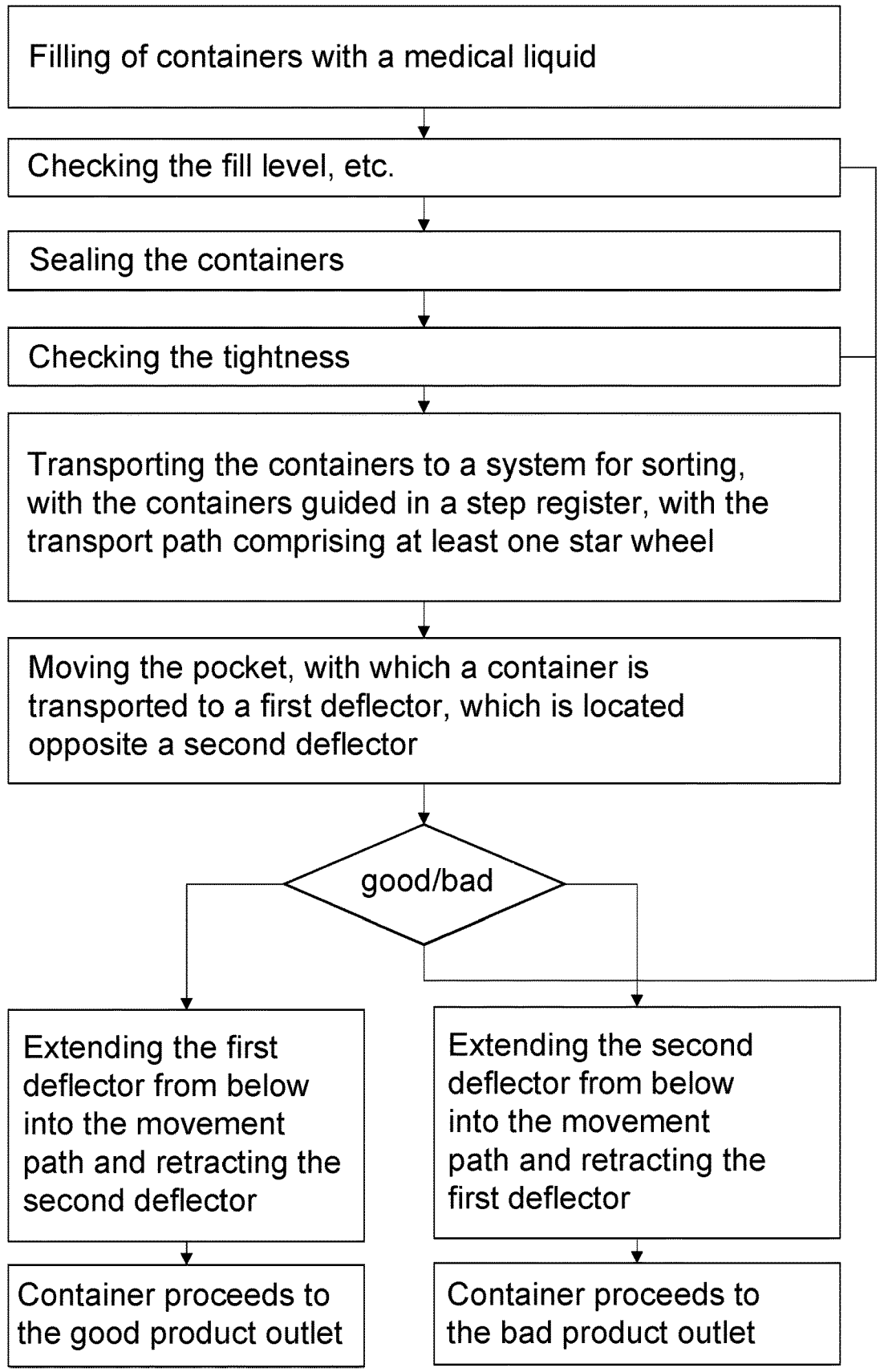

FIG. 7 is a flow diagram of the method steps according to an exemplary embodiment of the invention.

DETAILED DESCRIPTION OF THE DRAWINGS

Figure 1:
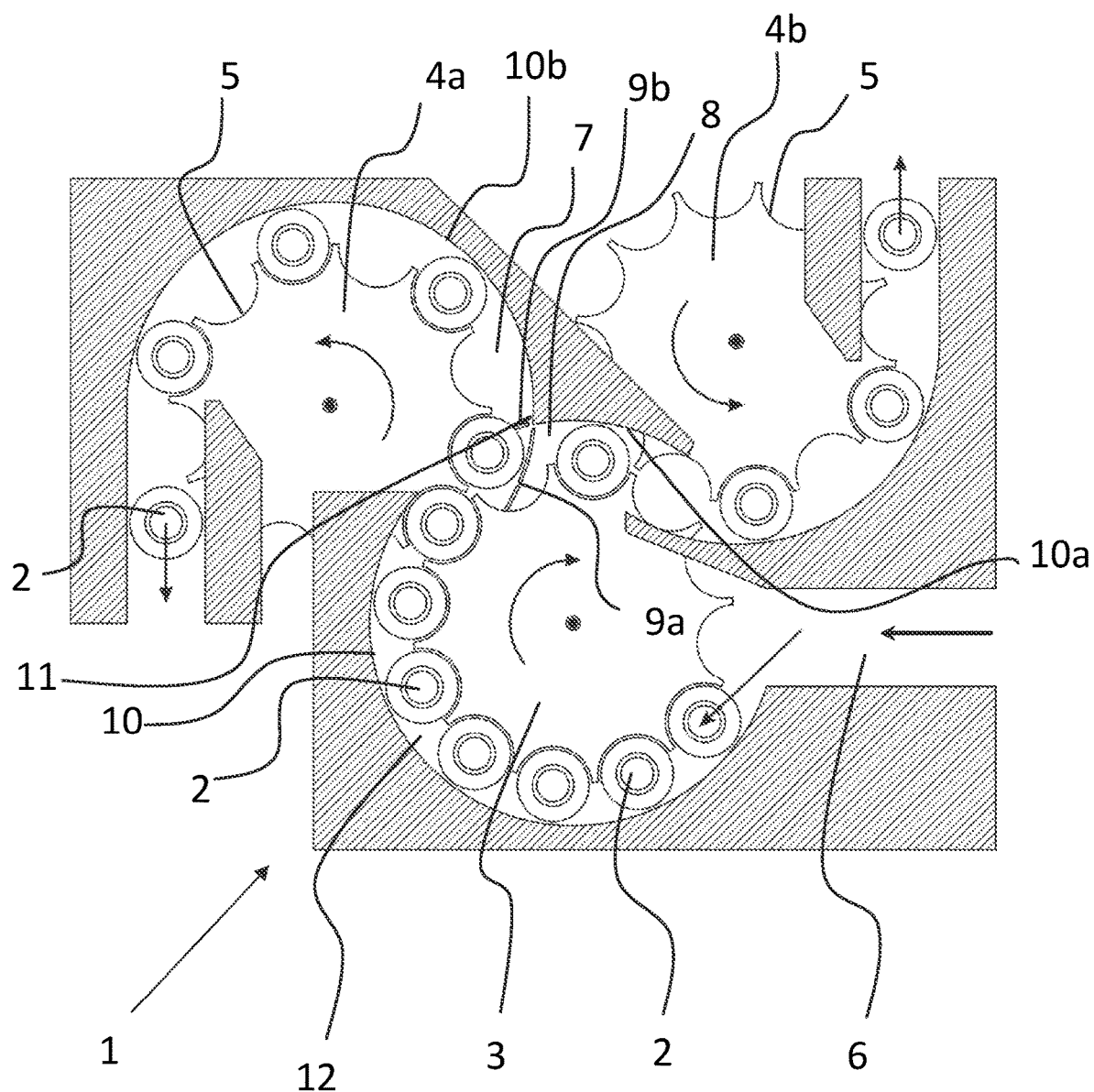
FIG. 1 is a schematic view of an exemplary embodiment of a system for sorting containers.

FIG. 1 shows in a top view, represented schematically, a first exemplary embodiment of a system 1 for sorting containers 2.

Figure 6:
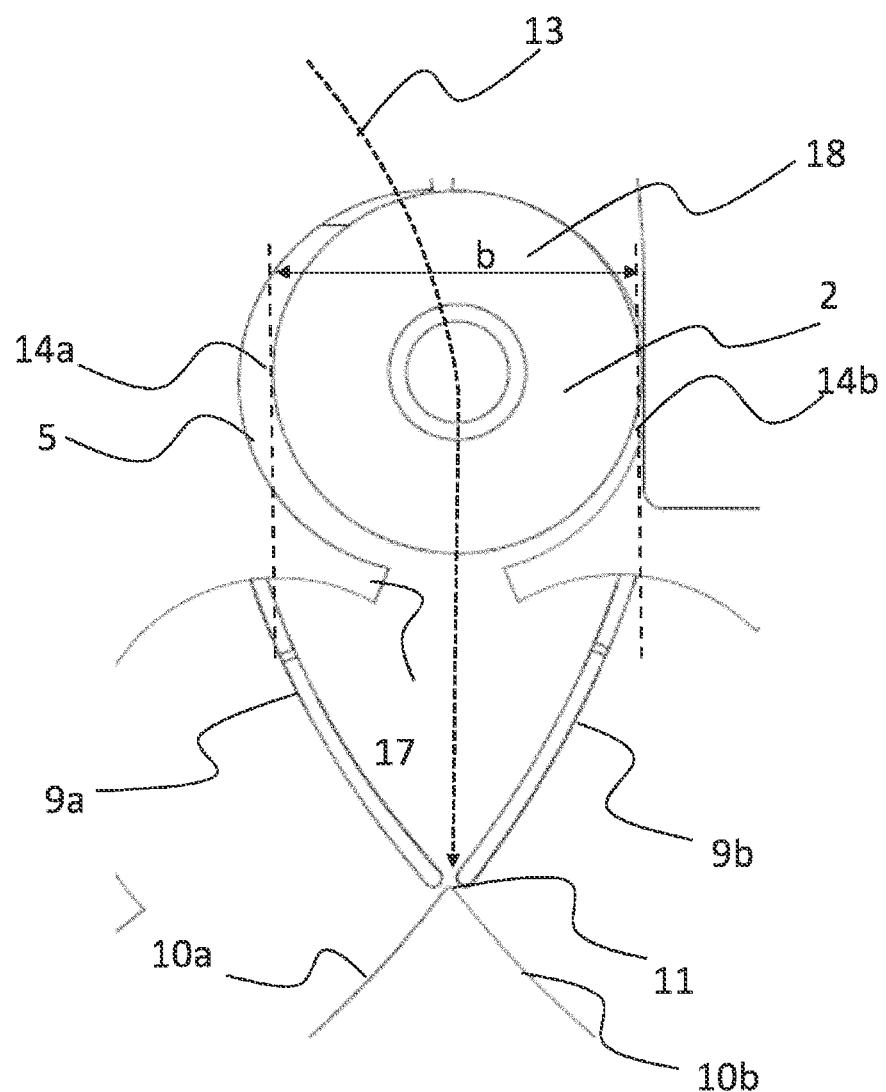

The containers 2 are fed to the system 1 via an inlet 6 and moved via the rotating star wheel 3 comprising pockets 5, along a transport track 18 (see also FIG. 6).

Details of the inlet 6 are not represented in this schematic view. The inlet 6 preferably makes it possible to guide the containers 2 in a step register. The inlet can for example be formed as a further star wheel or as a transport track comprising pockets.

The containers 2 run along a lateral guide 10 via the rotating star wheel 3 to a position at which the opposing deflectors, here the first deflector 9a and the second deflector 9b, are arranged.

Sorting into a first outlet 7, which is formed for example as a good product outlet, and into a second outlet 8, which is formed e.g., as a bad product outlet, is carried out via the first deflector 9a and the second deflector 9b.

In this exemplary embodiment, the containers 2 are fed by the raised first deflector 9a to the first outlet 7 by them leaving the movement path along the star wheel 3 and being fed to the star wheel 4a.

The containers 2 are for example fed to a packing station by the star wheel 4a.

If the first deflector 9a is lowered and the second deflector 9b raised, then the containers 2 are now moved further along this movement path of the star wheel 3 by the star wheel 3 in order to then be transported further by the star wheel 4b.

The first and second deflector 9a and 9b are here formed as a curved blade, which can extend from a base region 12. They are arranged on or at the movement path 13 of the containers 2 in the star wheel 3 and converge adjoining an edge 11. The lateral guide 10a of the star wheel 3 intersects with the lateral guide 10b of the star wheel 4b at the edge 11.

Figure 2:
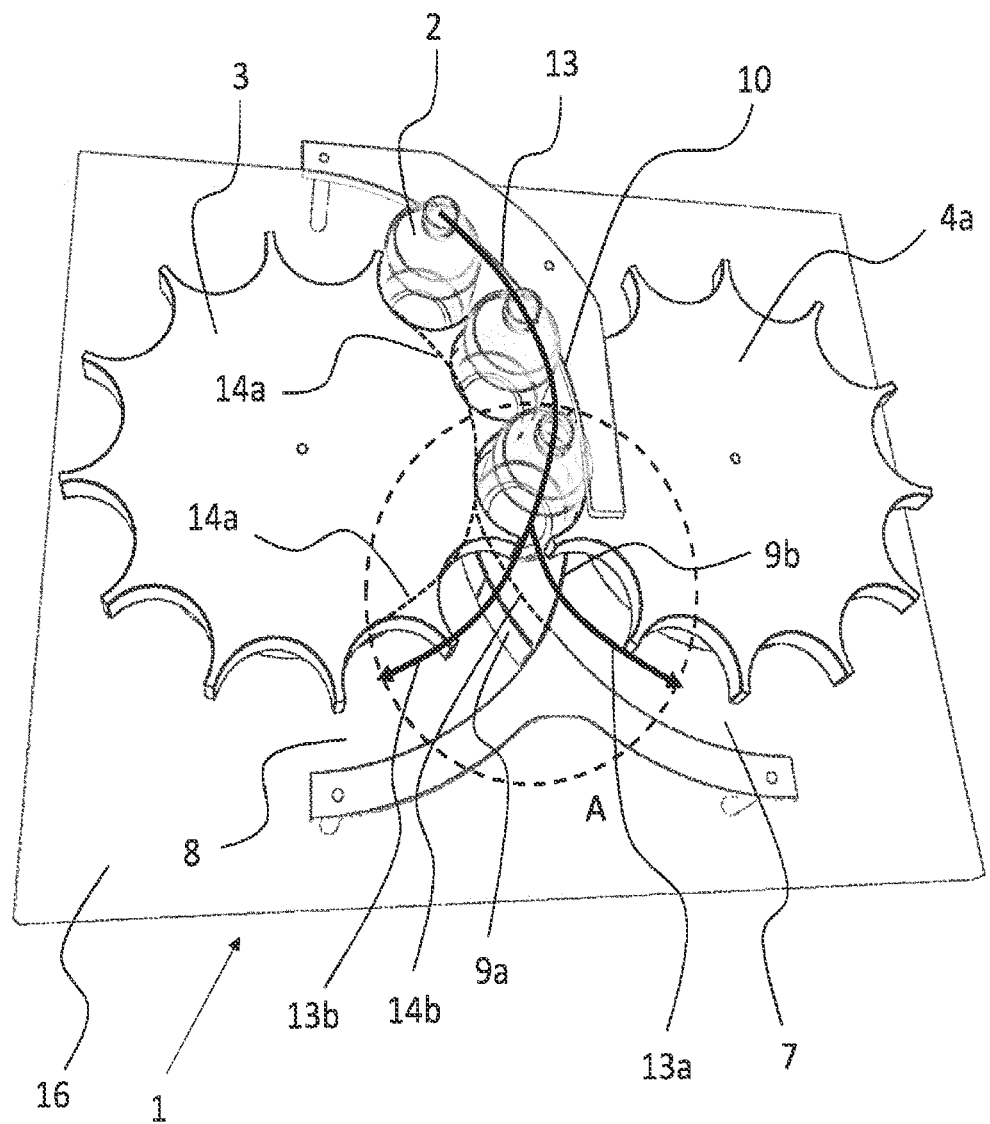
FIG. 2 is a perspective view of a system for sorting containers.

FIG. 2 is a perspective view of another exemplary embodiment of a system 1 for sorting containers 2.

In addition to the star wheel 3, which feeds the containers 2 to the deflectors 9a, 9b, a further star wheel 4a is provided. The continued transport via other star wheels is not represented for better clarity.

The containers 2 run along a movement path 13, which extends around the rotational axis of the star wheel 3, to the two deflectors 9a, 9b.

The deflectors 9a, 9b are formed as curved blades, which can extend vertically from a plate 16, along which the containers 2 run.

If, as represented here, the first deflector 9a is extended, then the container 2 leaves the movement path 13 extending around the star wheel 3 and merges into the movement path 13a, which extends around the star wheel 4a, upon reaching the deflector 9a. Then, the container 2 is fed to the first outlet 7.

In contrast, if the first deflector 9a is lowered and the second deflector 9b raised, then the container 2 continues to run along the movement path 13b around the star wheel 3. Then the container 2 is fed to the second outlet 8.

The containers are moved along the transport track 18. The transport track 18 is defined by the base region 12, along which the containers 2 are moved. The transport track 18 runs between the inner 14a and the outer radius 14b of the movement path 13 and forms a lane. The width of the lane is defined by the diameter of the containers 2. The containers 2 are moved along the movement path 13 on the lane (see also FIG. 6).

The inner radius 14a and the outer radius 14b are each marked with a broken line.

If the first deflector 9a is lowered and the second deflector 9b raised, the container 2 runs further along the inner radius 14a of the movement path 13 or further along the section 13a of the movement path 13 around the star wheel 3.

If, as represented here, the container 2 is, however, guided by the raised first deflector 9a into the good product outlet 7, then the inner radius 14a merges into the outer radius 14b in this exemplary embodiment due to the change in movement direction.

The outer radius 14b of the section of the movement path 13 extends upon transfer of the container 2 into the star wheel 4a around the rotational axis of the star wheel 4a.

Preferably, both the curvature of the first deflector 9a formed as a blade and the curvature of the second deflector 9b formed as a blade correspond to the outer radius 14b of the movement path 13.

Figure 3:
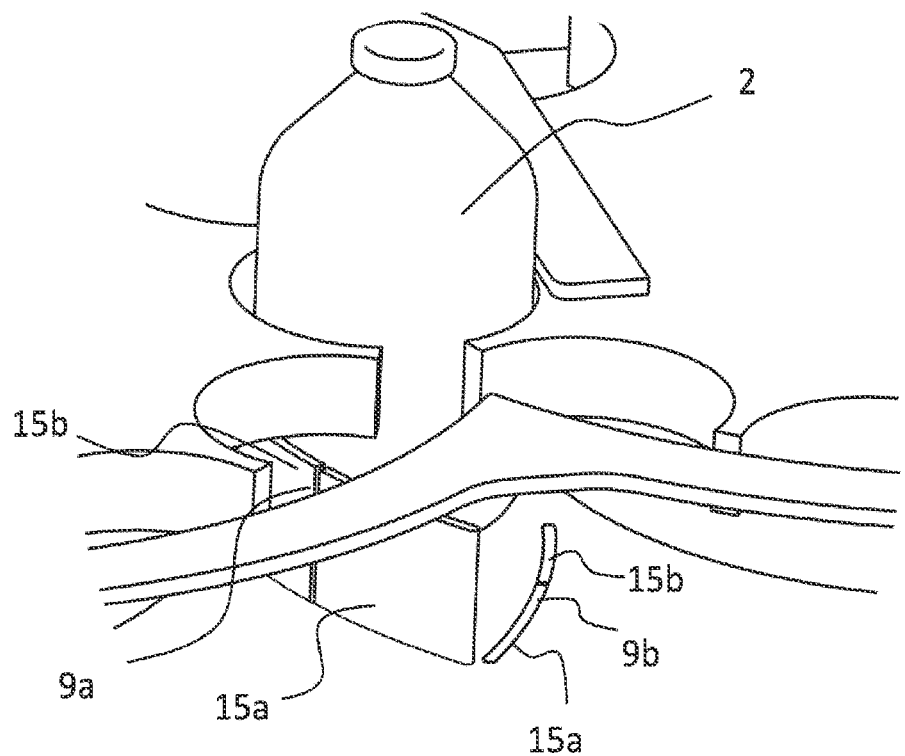
FIG. 3 is a detail view of the system represented in FIG. 2.

FIG. 3 is a detail view of the system 1 represented in FIG. 2. The region marked with A in FIG. 2 is roughly represented, but in a somewhat different perspective.

Both the first deflector 9a and the second deflector 9b are divided into a front segment 15a and a rear segment 15b, respectively.

The segments 15a and 15b are in each case taken together formed as curved blades and together each form the first or second deflector 9a, 9b.

Based on this configuration, the rear segment 15b can be retracted or extended, while a container 2 is still located in contact with the front segment 15a of the respective deflector 9a, 9b.

Figure 4A:
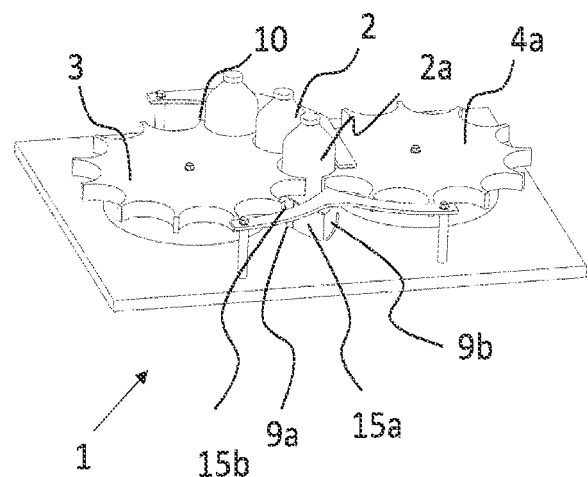
FIG. 4a to FIG. 4n each show in a perspective view (left) and a top view (right) a system for sorting containers, comprising deflectors which are divided into segments. On the basis of these representations, it is explained how the sorting of the containers takes place by switching the deflectors. In the case of the views according to FIGS. 4d, 4e and 4i, the containers and the star wheels are represented partially transparent so that the deflectors can be represented to be more easily visible.
Figure 4A:
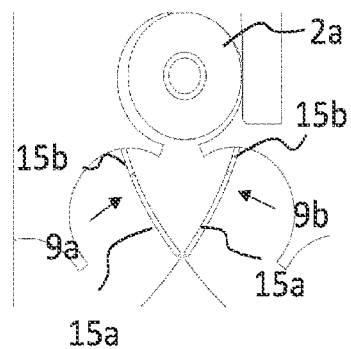
Figure 4B:
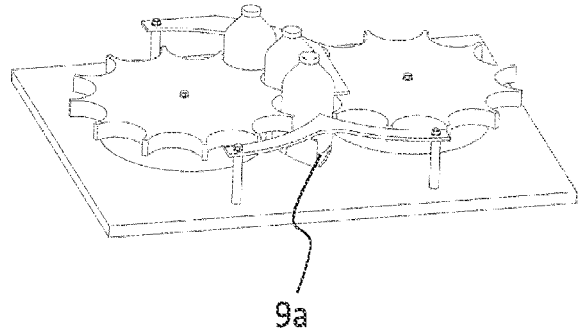
Figure 4B:
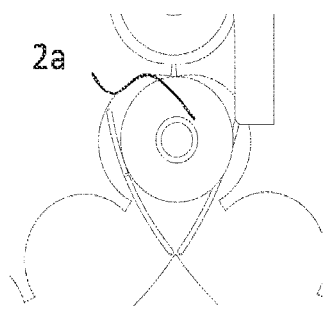
Figure 4C:
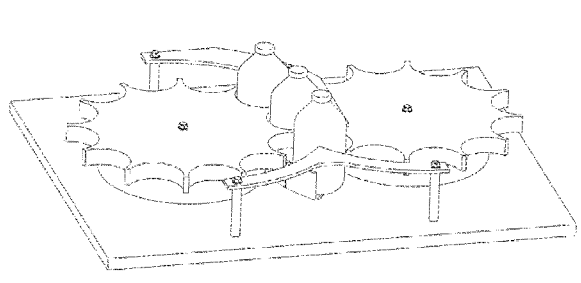
Figure 4C:
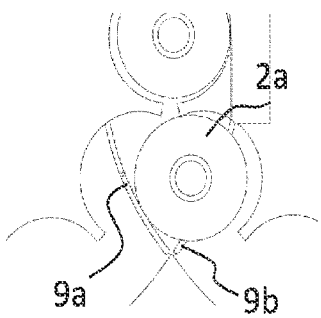
Figure 4D:
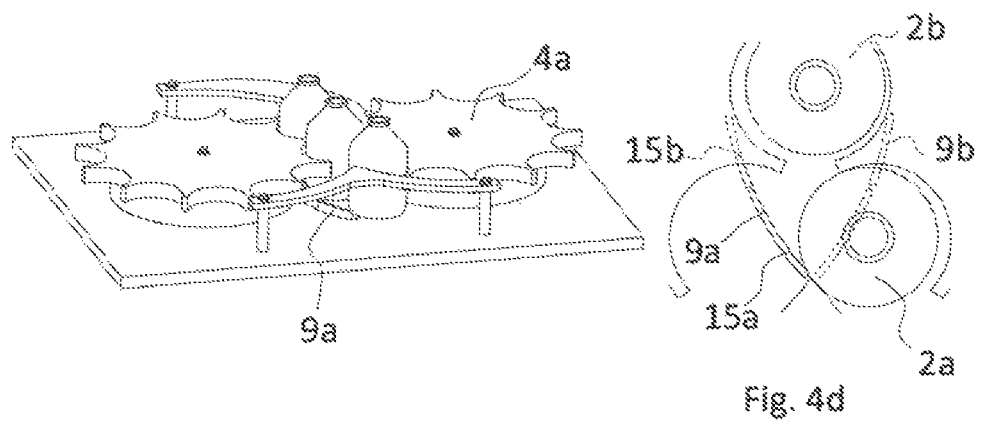
Figure 4E:
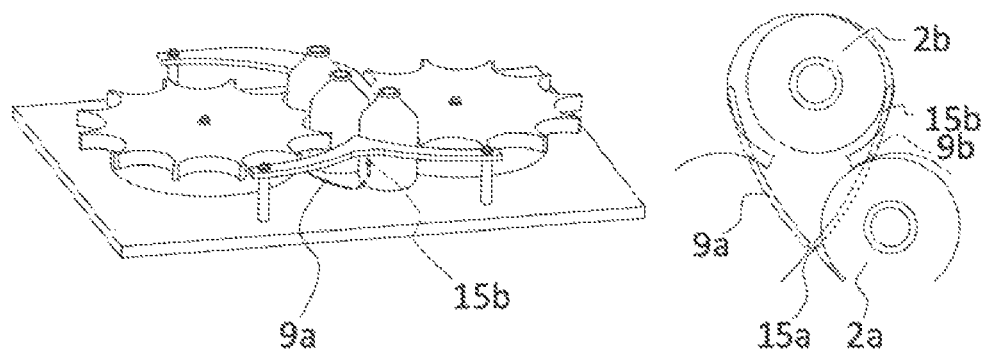
Figure 4F:
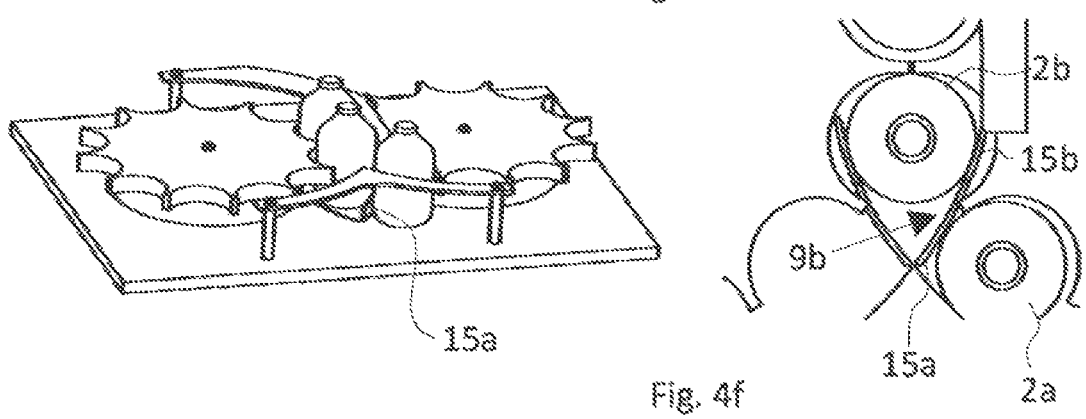
Figure 4G:
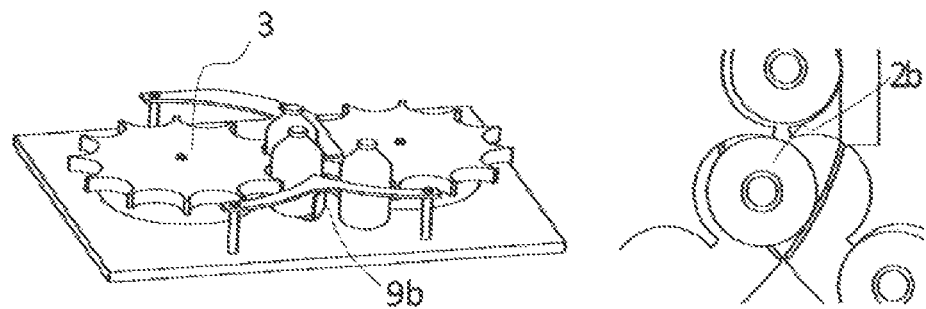
Figure 4H:
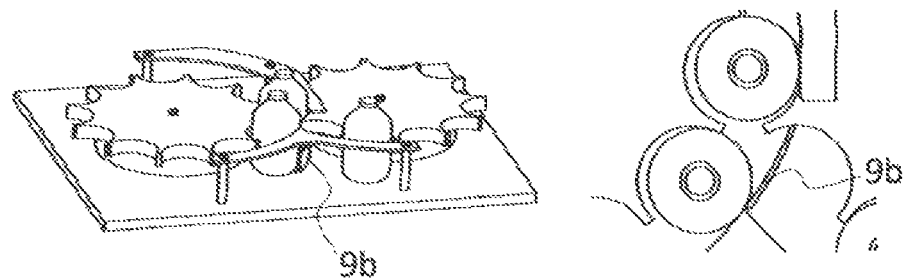
Figure 4I:
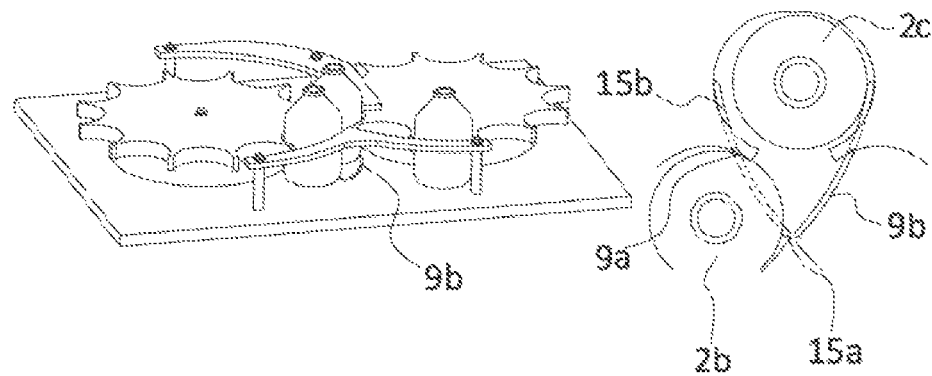
Figure 4J:
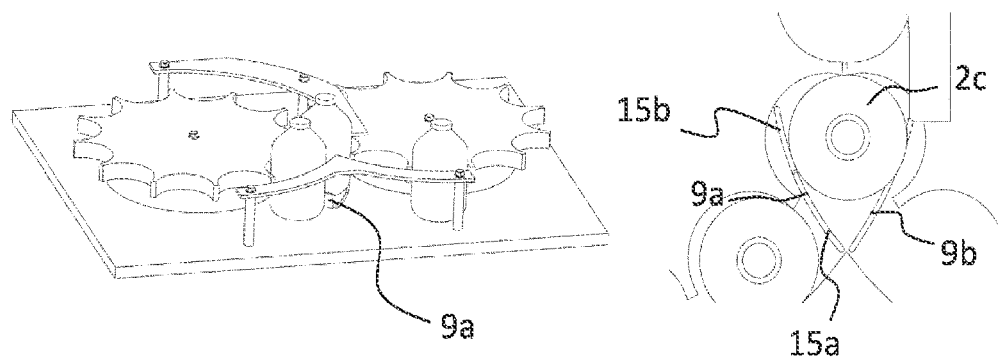
Figure 4K:
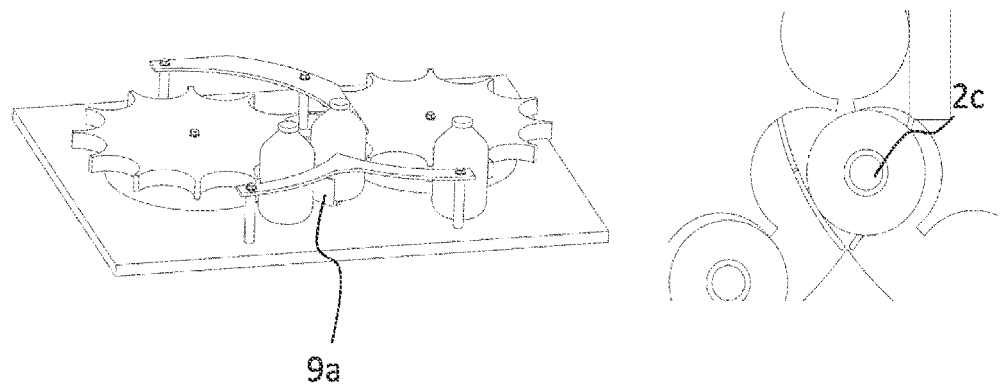
Figure 4L:
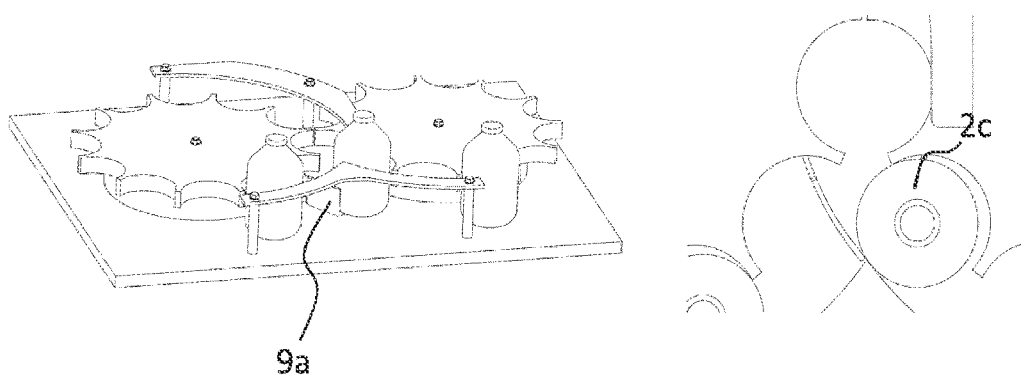
Figure 4M:
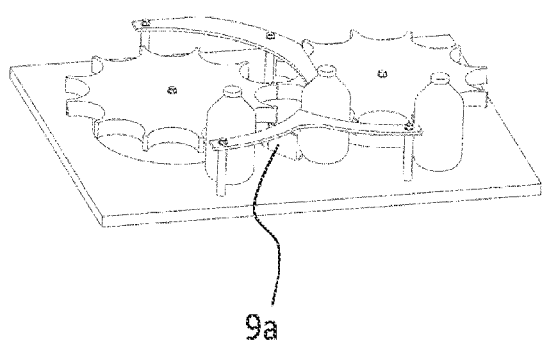
Figure 4M:
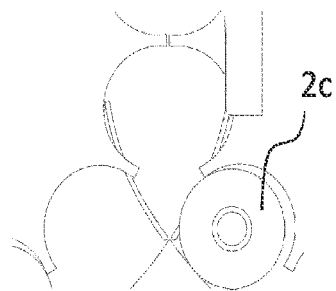
Figure 4N:
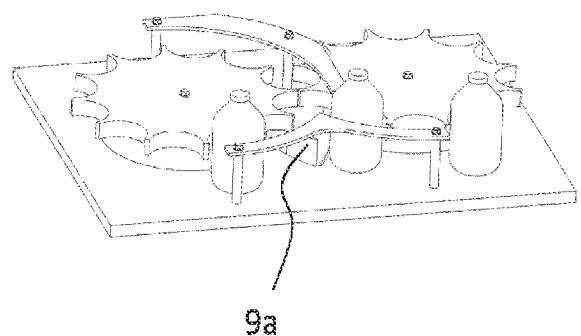
Figure 4N:
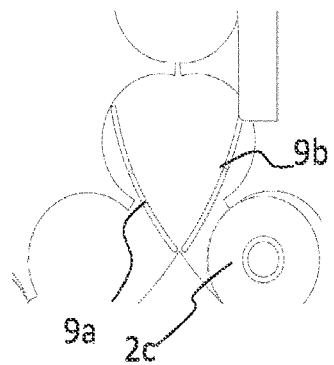

FIG. 4a to FIG. 4n show the exemplary embodiment of a system 1 shown in FIG. 2 and FIG. 3 for sorting containers 2 into different switching states.

Each case is represented a perspective view (left) of the system 1 with a top view (right) to the region of the deflectors 9a, 9b.

As represented in FIG. 4a, the containers 2 are moved by the star wheel 3 along the lateral guide 10 until they come to the deflector 9a extended in FIG. 4a.

The first deflector 9a and the second deflector 9b are divided into a front segment 15a and a rear segment 15b, respectively.

The first deflector 9a is fully extended in the representation according to FIG. 4a. Thus, the segments 15a and 15b are extended from the base region 12 such that the containers 2 are fed to the first outlet 7, which is defined in this exemplary embodiment by a transfer into the star wheel 4a.

In the top view, it can be seen that the two deflectors 9a and 9b are located opposite one another and are arranged roughly mirror-symmetrically along the movement path 13 of the container 2a represented here.

The star wheels 3, 4a have each been rotated a little further in the subsequent views.

As represented in FIG. 4b, the container 2a is deflected by the first deflector 9a into the direction of the first outlet 7 (e.g., good product outlet).

As represented in FIG. 4c, the container 2a passes the fully lowered second deflector 9b.

As represented in FIG. 4d, the container 2a is followed by a further container 2b which is intended, however, to be directed into the second outlet 8 (e.g., a bad product outlet).

For this purpose, the first deflector 9a is lowered. The lowering can take place while the first deflector 9a is still in contact with the container 2a since it has already changed the movement direction and is now supported by the lateral guide 10b of the star wheel 4a.

In the representation according to FIG. 4e, the first deflector 9a is now fully lowered.

The container 2a still blocks a part of the second deflector 9b, while the next container 2b already travels towards the second deflector 9b. In the detail, the container 2a blocks the front segment 15a of the second deflector 9b.

Due to the segmented configuration of the second deflector 9b, while the container 2a still blocks the front segment 15a of the deflector 9b, the rear segment 15b of the second deflector 9b can already be raised, with which the following container 2b then comes into place.

As soon as the container 2a has fully left the region of the second deflector 9b, as represented in FIG. 4f, and no longer blocks it, the front segment 15a of the second deflector 9b can also be raised.

The container 2b is, as represented in FIG. 4g, now fed to the second outlet 8 by remaining on the movement path 13, which extends around the star wheel 3.

As represented in FIG. 4h, the second deflector 9b, in order to then switch to the first outlet 7, can start to lower, while the container 2a is still in contact with the second deflector 9b.

In the representation according to FIG. 4i, the container 2b passes the lowered first deflector 9a, while the second deflector 9b already lowers.

The first deflector 9a, starting with the rear segment 15b, can extend for the now subsequent container 2c, which is intended to be directed into the first outlet 7, while the container 2b still blocks the front segment 15a of the first deflector 9a.

As represented in FIG. 4j to FIG. 4l, the front segment 15a of the first deflector 9a then also extends and therefore the entire first deflector 9a (FIG. 4k) fully raises such that, as represented in FIG. 4l, the containers 2 are guided back to the first outlet 7.

FIG. 4m and FIG. 4n show how the container 2c leaves the region of the deflectors 9a, 9b, which forms the sorting region.

As long as containers 2 are not to be sorted out, the first deflector 9a remains raised and all containers 2 are transported to the first outlet 7. The deflectors 9a, 9b are switched back into the status represented in FIG. 4a.

Figure 5:
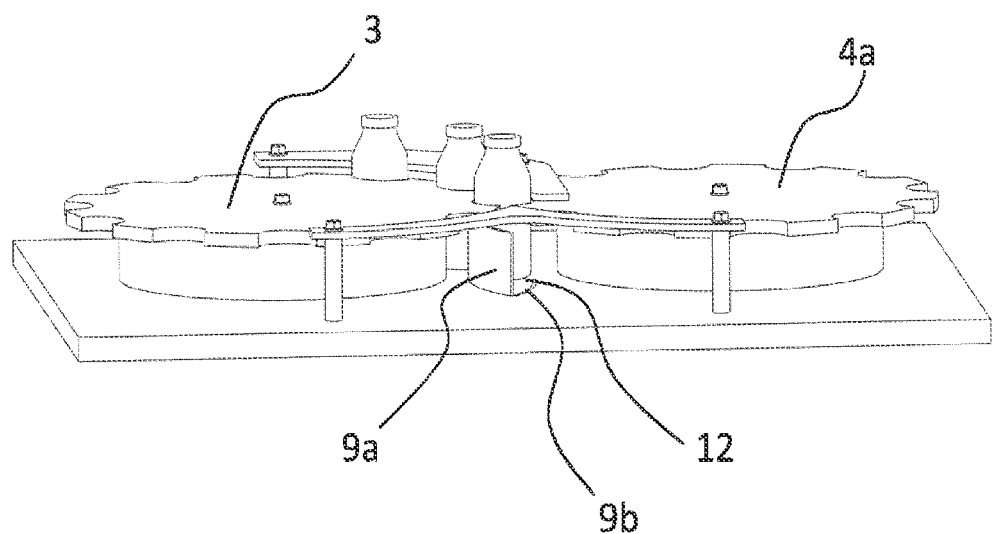
FIG. 5 is a perspective view of an alternative embodiment of a system for sorting containers comprising deflectors which are not divided into segments.
Figure 5A:
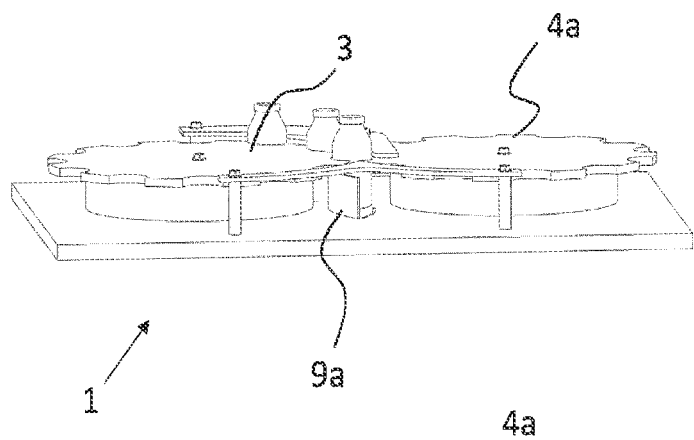
FIG. 5a to FIG. 5i in turn show in a perspective view (left) and a top view (right) of the operation of the system and the switching of the deflectors from FIG. 5.
Figure 5A:
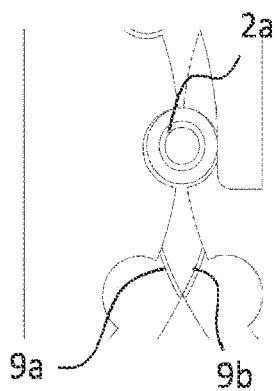

FIG. 5 is a perspective view of a further embodiment of the invention.

Unlike the previously described embodiment according to FIG. 2 to FIG. 4, the two deflectors 9a, 9b are formed in one part, thus they do not comprise vertically divided segments.

The deflectors, here again the first deflector 9a and the second deflector 9b, are, however, otherwise also formed as curved swords, which are extended from the base region 12 of the transport track 18.

FIG. 5a to FIG. 5i in turn show a perspective view (left) of the system 1 for sorting containers 2 and juxtaposed a top view (right) of the region of the deflectors 9a, 9b. The first deflector 9a is raised in the representation according to FIG. 5a.

Figure 5B:
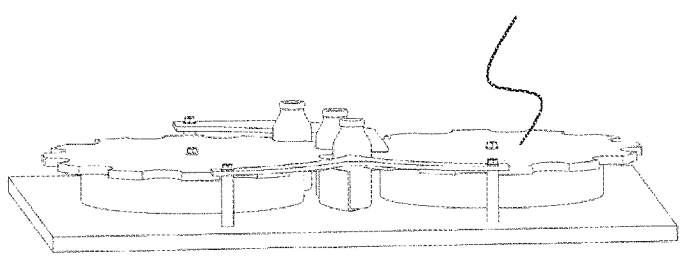
Figure 5B:
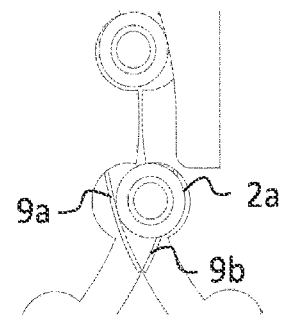
Figure 5C:
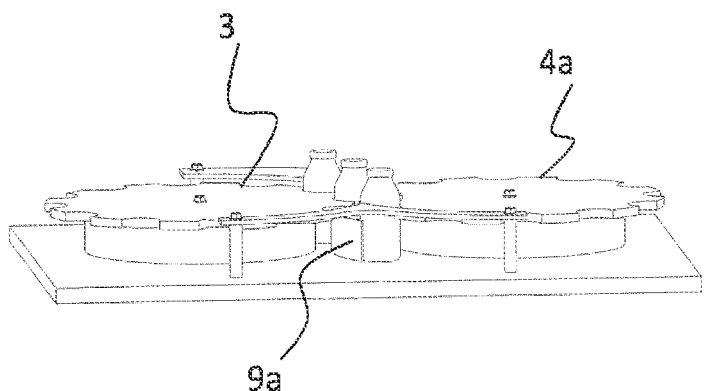
Figure 5C:
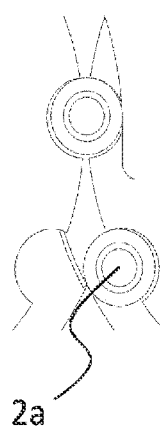

The container 2a transported by the star wheel 3 is, as represented in FIG. 5b and FIG. 5c, fed to a first outlet 7 via the first deflector 9a by the container 2a being delivered to the star wheel 4a by the raised first deflector 9a.

Figure 5D:
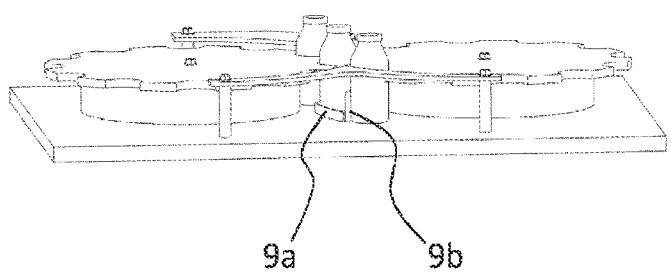
Figure 5D:
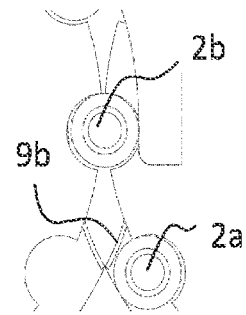

FIG. 5d shows the starting time of the switch to the second outlet 8. The following container 2b will now no longer be delivered to the star wheel 4a, but rather be transported further with the star wheel 3.

The container 2a has passed the lowered second deflector 9b.

The second deflector 9b is now raised, while the first deflector 9a is simultaneously lowered.

The overlapped switching of the two deflectors 9a, 9b enables a switchover even at higher movement speeds.

Figure 5E:
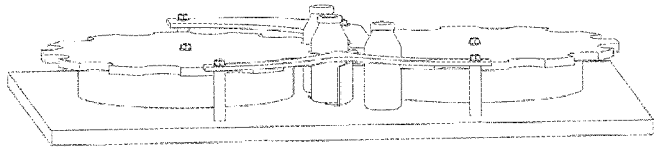
Figure 5E:
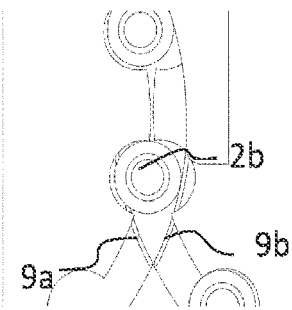
Figure 5F:
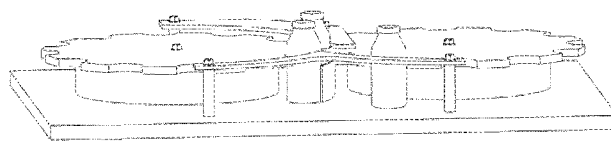
Figure 5F:
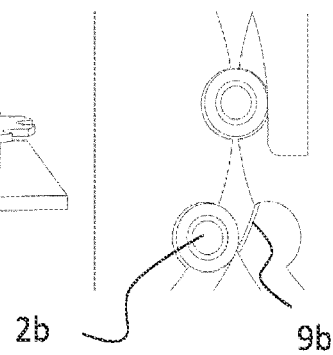

As represented in FIG. 5e, the first deflector 9a is now fully lowered and the container 2b passes the deflector 9a (FIG. 5f).

Figure 5G:
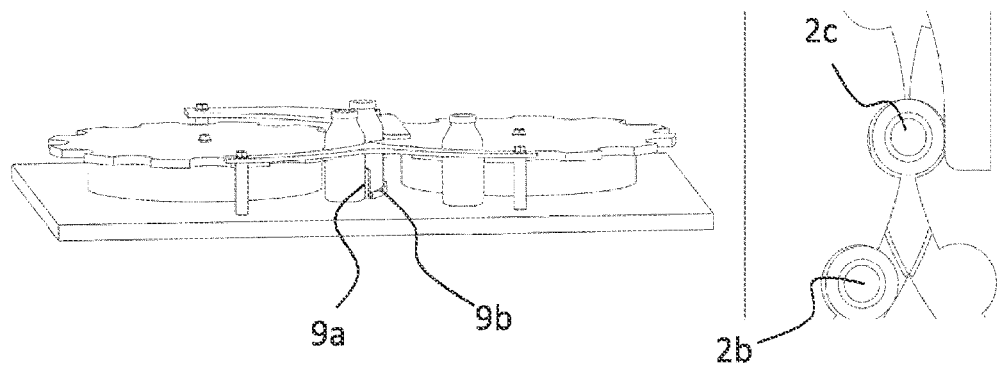
Figure 5H:
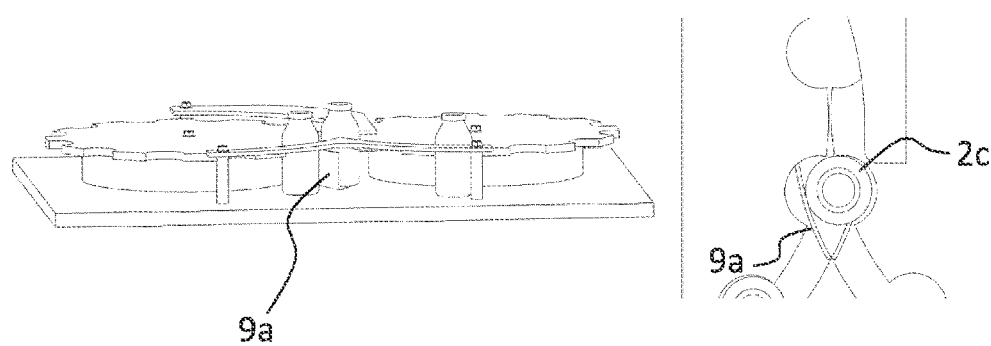
Figure 5I:
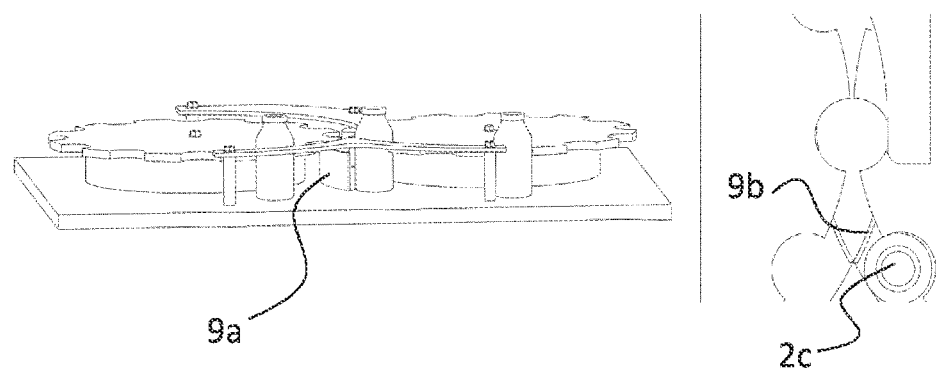

Then, as represented in FIG. 5g to FIG. 5i, in accordance with the previously described switchover to the second outlet 8, switching over takes place back to the first outlet 7 by the first deflector 9a being extended, while the second deflector 9b is lowered.

The container 2c following the container 2b is directed by the raised first deflector 9a over the lowered second deflector 9b into the first outlet 7. The system 1 for sorting is switched back to the first outlet 7 (according to FIG. 5a).

On the basis of the top view according to FIG. 6, the geometry and arrangement of the two deflectors 9a, 9b are again explained in detail.

The containers 2 firstly run on a movement path 13, which runs around the rotational axis of the star wheel 3, towards the two deflectors 9a, 9b.

The outer radius 14b of the movement path 13 corresponds to the radius of the guide 10, along which the containers 2 run when the star wheel 3 rotates.

The deflectors 9a, 9b are located symmetrically opposite roughly on a tangent of the movement path 13. The tangent corresponds roughly to the position at which the region of the deflectors 9a, 9b starts.

In this representation, it can be seen that the movement path 13 is offset outwards with respect to a symmetry axis of the opposing deflectors 9a, 9b. This is due to the containers 2 not taking up the maximum possible width of the movement path 13, but instead the inner radius 14b of the movement path 13 not reaching up to the bottom of the pocket 5. Due to the centripetal force, the container 2 thus does not rest inwards on the bottom of the pocket 5, but rather only on the fingers 17 formed by the pockets, which act as drivers for the containers 2 when the star wheel 3 rotates. Thus, e.g., containers 2 of different sizes can be conveyed or tolerances can even be balanced out.

The transport track 18 in the context of the invention is the lane between the inner 14a and the outer radius 14b of the movement path 13. The transport track 18 has the width b. In this representation, the broken line symbolizing the movement path 13 is drawn in as the straight line once the region of the deflectors 9a, 9b is reached. This would be the further movement of a container 2 if it were not directed by one or the other deflector 9a, 9b.

The deflectors 9a, 9b are formed as blades, which can extend from the transport track 18 from below. The two deflectors 9a, 9b converge in the movement direction of the containers 2 starting from the inner 14a and outer radius 14b of the transport track 18, to the edge 11 at which the lateral guides 10a and 10b intersect. The radius of curvature of the deflectors 9a, 9b preferably corresponds roughly to the outer radius 14b of the movement path 13.

Depending on which deflector 9a, 9b is raised, a container 2 runs either along one lateral guide 10a, which leads to the outlet 8, or on the other lateral guide 10b, which leads to the outlet 7.

FIG. 7 is a flow diagram of an exemplary embodiment of a method according to the invention.

The method is carried out in a system 1 for filling containers 2 with a medical liquid.

The containers 2 are firstly filled.

The fill level can be controlled during or after the filling. Other checks, such as for example an automated visual inspection of the containers 2 can also be carried out.

The containers 2 are then sealed and checked for leaktightness.

The system 2 is preferably operated in a cycled manner, i.e., in the case of each cycle a plurality of containers 2 are subjected to a production step.

The containers 2 are guided in a step register, with the transport path 18 comprising at least one star wheel 3.

The position of a defective container 2 is uniquely defined on the basis of the step register.

The pocket 5, with which a container 2 is transported in the star wheel 3, is moved towards a first deflector 9a, which is located opposite a second deflector 9b.

It is determined based on this check whether the respective container 2 is directed into a good product or a bad product outlet 7, 8.

Thus, either the first deflector 9a is extended and the second deflector 9b retracted in order to direct the container 3 to the good product outlet 7, or the second container 9b is extended and the first deflector 9a retracted in order to direct the container 2 to the bad product outlet 8.

The deflectors 9a, 9b are retracted from below as curved blades into the transport track 18 such that a fast switchover is possible even during a cycle.

The reliability of a sorting system known from the prior art with vacuum plates can be significantly improved with surprising ease and the design of the system simplified at the same time.

LIST OF REFERENCE NUMERALS

1 System for sorting containers
2, 2a, 2b, 2c Container
3 Star wheel
4a, 4b Star wheel
5 Pocket
6 Inlet
7 First outlet (good product outlet)
8 Second outlet (bad product outlet)
9a First deflector
9b Second deflector
10, 10a, 10b Lateral guide
11 Edge
12 Base region
13 Movement path
13a, 13b Section of the movement path 13
14a Inner radius of the movement path 13
14b Outer radius of the movement path 13
15a Front segment of a deflector (9a, 9b)
15b Rear segment of a deflector (9a, 9b)
16 Plate
17 Finger
18 Transport track

The invention claimed is:

1. A system for sorting containers, in particular medical bottles, comprising:
   a star wheel with a plurality of pockets which each receive a container such that said container is transportable through a rotation of the star wheel, and
   a first and a second outlet, wherein the containers can be fed either to the first or the second outlet by retracting and extending a first deflector and a second deflector, which are located opposite one another on a transport track,
   wherein the first deflector and the second deflector are configured so as to be extendable and retractable starting from a base region of the transport track,
   wherein the first and/or the second deflector has segments divided in an extension direction, wherein the segments are configured to be retracted and/or extended separately.

2. The system according to claim 1, wherein the first and the second deflector can be extended from a base transversely to the transport track.

3. The system according to claim 1, wherein the system is configured in such manner that the first deflector can be extended, while the second deflector is at least partially extended.

4. The system according to claim 1, wherein the segments are configured to be retracted and/or extended independently of one another.

5. The system according to claim 1, wherein the first and/or second deflector can be extended from a plate, which provides the base region, and can be retracted into the plate.

6. The system according to claim 1, wherein the first and/or second deflector comprise a blade.

7. The system according to claim 1, wherein the system is configured in such manner that the first deflector, in the extended state, directs a container into a good product outlet being the first outlet and the second deflector, in the extended state, directs a container into an opposing bad product outlet being the second outlet.

8. The system according to claim 1, wherein the first and/or the second deflector is/are curved with a radius of curvature that corresponds substantially to an outer radius of a movement path of the containers.

9. The system according to claim 1, wherein the first and/or second outlet lead to a second and/or third star wheel.

10. A method for sorting containers wherein the containers are transported by means of a rotating star wheel which has pockets, the method comprising:
transporting the containers by the star wheel to at least one deflector, and
directing a container either to a first outlet or to a second outlet by retracting and extending the at least one deflector, the at least one deflector being extended from below into a movement path of the containers to the first outlet or the second outlet,
wherein the at least one deflector is divided into at least one front and one rear segment, wherein in the case of switch from the first outlet to the second outlet or vice versa, the rear segment is retracted and/or extended separately from the front segment.

11. The method according to claim 10, wherein the at least one deflector is extended from a base region of the movement path.

12. The method according to claim 10, wherein the rear segment is retracted and/or extended earlier than the front segment.

13. The method according to claim 10, wherein the at least one deflector is extended in such manner that it reaches beyond a tipping point of the containers and/or in that the at least one deflector is retracted and/or extended during the continuous operation or during a cycle.

14. The method according to claim 10, wherein the at least one deflector comprises a first deflector, wherein a container is directed to the first outlet or to the second outlet by retracting and extending the first deflector, and a second deflector opposite the first deflector.

15. The method according to claim 14, wherein the first deflector and the second deflector are each divided into at least one front and one rear segment configured to move separately.

16. The method according to claim 10, wherein the rear segment is already extended when a container still blocks the front segment.

17. The method according to claim 10, wherein containers filled with a liquid, in particular bottles filled with a medical liquid, are manufactured by means of the method, wherein firstly the containers are filled in a filling system and sealed and then are sorted by retracting and extending the at least one deflector, in particular wherein the first outlet is a good product outlet and the second outlet is a bad product outlet, in which defective containers, containers to be checked and/or reserve containers are sorted out.

18. The method according to claim 10, wherein the containers are guided in a step register.

19. A method for sorting containers wherein the containers are transported by means of a rotating star wheel which has pockets, the method comprising:
transporting the containers by the star wheel to at least one deflector, and
directing a container either to a first outlet or to a second outlet by retracting and extending the at least one deflector, the at least one deflector being extended from below into a movement path of the containers to the first outlet or the second outlet,
wherein the at least one deflector comprises a first deflector, wherein a container is directed to the first outlet or to the second outlet by retracting and extending the first deflector, and a second deflector opposite the first deflector,
wherein the first deflector is retracted and/or extended so as to overlap the second deflector and/or the first deflector is extended, while the second deflector is still in contact with a container, which is directed to an outlet.

20. The method according to claim 19, wherein in the case of switch from the first outlet to the second outlet or vice versa, the first and/or second deflector is retracted at least in sections, while a container is still in contact with another of the first and/or second deflector.

* * * * *